United States Patent
Jaouen

(10) Patent No.: US 7,332,241 B2
(45) Date of Patent: Feb. 19, 2008

(54) CATHODE LAYER STRUCTURE FOR A SOLID POLYMER FUEL CELL AND FUEL CELL INCORPORATING SUCH STRUCTURE

(75) Inventor: Frederic Jaouen, Solna (SE)

(73) Assignee: AB Volvo, Gothenburg (SE)

( * ) Notice: Subject to any disclaimer, the term of this patent is extended or adjusted under 35 U.S.C. 154(b) by 403 days.

(21) Appl. No.: 10/399,905

(22) PCT Filed: Oct. 18, 2001

(86) PCT No.: PCT/SE01/02275

§ 371 (c)(1),
(2), (4) Date: Oct. 6, 2003

(87) PCT Pub. No.: WO02/35633

PCT Pub. Date: May 2, 2002

(65) Prior Publication Data

US 2004/0028992 A1    Feb. 12, 2004

(30) Foreign Application Priority Data

Oct. 27, 2000 (SE) .................... 00039669

(51) Int. Cl.
*H01M 2/90* (2006.01)
*H01M 4/88* (2006.01)

(52) U.S. Cl. ............ 429/42; 429/44; 429/40; 502/101; 427/115

(58) Field of Classification Search ........... 429/42, 429/41, 40, 44; 427/115; 502/101; 252/182.1
See application file for complete search history.

(56) References Cited

U.S. PATENT DOCUMENTS 4,804,592 A * 2/1989 Vanderborgh et al. ........ 429/33
6,106,965 A    8/2000 Hirano et al.

FOREIGN PATENT DOCUMENTS

EP    0 920 065    6/1999
JP    A 7335233    4/1996

* cited by examiner

Primary Examiner—Raymond Alejandro
(74) Attorney, Agent, or Firm—Young & Thompson

(57) ABSTRACT

A cathode layer structure for a solid polymer fuel cell is disclosed. It comprises a composite cathode layer (48) of catalyst (11), anion ion conducting polymer (12) and cation conducting polymer (14). The interface between the anion ion conducting polymer (12) and the cation conducting polymer (14) is located entirely within the cathode layer (48). In particular the catalyst (11) is embedded in the anion conducting polymer (12), and the cation conducting polymer (14) encloses regions of the anion conducting polymer (12).

13 Claims, 3 Drawing Sheets

CATHODE LAYER STRUCTURE FOR A SOLID POLYMER FUEL CELL AND FUEL CELL INCORPORATING SUCH STRUCTURE

The present invention relates to solid polymer fuel cells in general, and to a cathode layer structure for such fuel cells in particular.

BACKGROUND OF THE INVENTION

Solid polymer fuel cells (SPFC) generally comprise a cathode structure and an anode structure separated by a proton conducting membrane. These cells are about to be commercialized both for mobile and stationary applications. Reduction of Pt catalyst amount and development of thinner membranes more adapted to fuel cell application have increased the energy density and decreased the cost of solid polymer fuel cells.

However, the slow kinetics of the oxygen reduction reaction (ORR) at the cathode side is still the main source of losses in a fuel cell using a proton conducting membrane. In order to have a current of e.g. 50 mA, the corresponding potential loss at cathode side is typically 450 mV with state of the art electrodes.

It is well known that the kinetics of the ORR is faster in alkaline medium than in acid medium. State of the art proton conducting membranes correspond to proton concentration of around 2 M, i.e. fairly acidic medium. On the other hand, anion conducting polymers exhibit worse conductivities as compared with state of the art cation conducting membranes. Finally, all kinds of alkaline fuel cells are subject to "carbonating" of the electrolyte, i.e. degradation of electrolyte conductivity if $CO_2$ is present in the fuel cell process (for example if air is used at cathode or $CO_2$ produced at anode).

Patent Abstracts of Japan, publication No. 7335233 A discloses a combination of alkaline and acid medium, which is possible only if the electrolytes are solid. In said document it is proposed to use anion exchange polymer and cation exchange polymer in different ways. Therein the benefit of water management expected at cathode side is emphasized. According to this document, the water resulting from the reactions in the cell is produced at the interface between the anion and cation exchanging polymers, but not within the cathode, thus decreasing risk of water flooding at the cathode. However there is no mention of the benefit of having the ORR taking place in alkaline medium. Thus, the interface between the anion exchange polymer and the cation exchange polymer is located externally of the cathode, so that water is produced outside the cathode.

SUMMARY OF THE INVENTION

Thus, in view of the drawbacks with prior art fuel cells, i.e. the acidic medium causing a reduced ORR, the object of the invention is to provide a cathode layer structure that combines the advantages with fast ORR kinetics in alkaline medium, with a reduced tendency of carbonating, normally present in fuel cells working with alkaline media.

Alternatively the problem could be formulated as how an alkaline medium can be provided at the cathode side to improve the ORR kinetics without suffering the disadvantages of electrolyte carbonating and/or the poor conductivities of state of the art anion exchange polymers.

The above indicated object is achieved with the cathode layer structure as defined in claim 1.

In accordance with the present invention, the cathode layer structure thus comprises a composite layer of cation (e.g. proton) exchange/conducting polymer, enclosing portions of anion (e.g. hydroxide) exchange/conducting polymer, wherein carbon supported catalyst is encapsulated inside the anion exchange polymer. In this way the interface between the hydroxide ion conducting polymer and the proton conducting polymer will be situated entirely within the cathode layer.

The main idea of using an anion conducting polymer in the cathode layer is to have a faster kinetics for the Oxygen Reduction Reaction which takes place at cathode side. The structure is porous for enabling the oxygen containing gas to reach the reaction sites. This cathode layer structure will present much faster ORR kinetics than state of the art cathodes. The expected benefit is 100 mV or more, and this benefit is kept until the cell approaches its limiting current density.

In the cathode layer stricture according to the present invention, anion exchange polymers with much lower conductivity (1 or 2 decades less) than state-of-the-art proton conducting polymer can be used, without major effect on the cathode performance.

This is thought to be due to the very short migration path for the hydroxide ions from the catalyst particles to the next proton conducting polymer (less than 0.5 µm is technically feasible with the spray technique—see FIG. 2).

Another reason is the fact that only the locally produced current will have to migrate through the hydroxide ion conducting polymer.

The conductivity through the cathode layer (typically 10 µm thick) is then imparted by the proton-conducting polymer.

As a consequence of this, the behaviour of such a cathode to electrolyte carbonating would be acceptable. This would not be the case if the whole active layer were made of alkaline solid electrolyte.

In addition, if partial carbonating of the anion exchange polymer occurs, the $CO_3^{2-}$ ions produced would be removed easily by diffusion and migration processes from the anion exchange polymer to the interface anion/cation exchange polymer where they would be consumed by the protons again.

To conclude, air as reactant or fuel producing $CO_2$ could be used with such a cathode layer structure.

There is also provided a fuel cell, comprising a cathode layer structure according to the invention, defined in claim 13.

In another aspect the invention provides a method of making a cathode layer structure, the method being defined in claim 14.

DETAILED DESCRIPTION OF PREFERRED EMBODIMENTS

A solid polymer fuel cell generally comprises a cathode and an anode structure on one side each of a proton conducting membrane, whereby the membrane separates the anode and cathode sides. There are also provided gas diffusion layers on the active anode and cathode structures for enabling fuel and oxidizing agent to reach the active layers. The entire assembly is sandwiched between current collector plates.

Furthermore, in general, porous cathodes for solid polymer fuel cells must meet the following requirements:

They must simultaneously have a good electrical conductivity, a good ionic conductivity, as well as gas pores free from water for gas reactant path, and high area of catalyst per gram of catalyst.

State or the art preparation of electrodes for solid polymer fuel cells uses the spray method. The cation conducting polymer in solution form is mixed with the Pt catalyst supported by carbon, then sprayed directly onto the membrane, and finally hot pressed.

A cathode electrode comprising both anion and cation solid polymer in accordance with the present invention can be made in the following manners, resembling the spray method of producing state-of-the-art cathodes.

1) As described above, mixing the cation exchange polymer and anion exchange polymer in solution form with the supported catalyst, then spraying onto the membrane and hot pressing.

2) As a first step, mixing only the anion exchange polymer with the supported catalyst and spraying onto the membrane. As a second step, impregnating or spraying the cation exchange polymer onto the cathode. Thereby, the major part of the catalyst particles will be only covered by the anion exchange polymer (gives high kinetics) while the cation exchange polymer will cover the homogeneous thin regions of Pt—C/anion-exchange polymer.

In method 1), only part of the catalyst would be in contact with the anion exchange polymer, thus the benefit would not be as good as if all catalyst is surrounded only by the anion exchange polymer, so method 1) is probably not to be preferred, but is on the other hand simpler than method 2).

Figure 1:
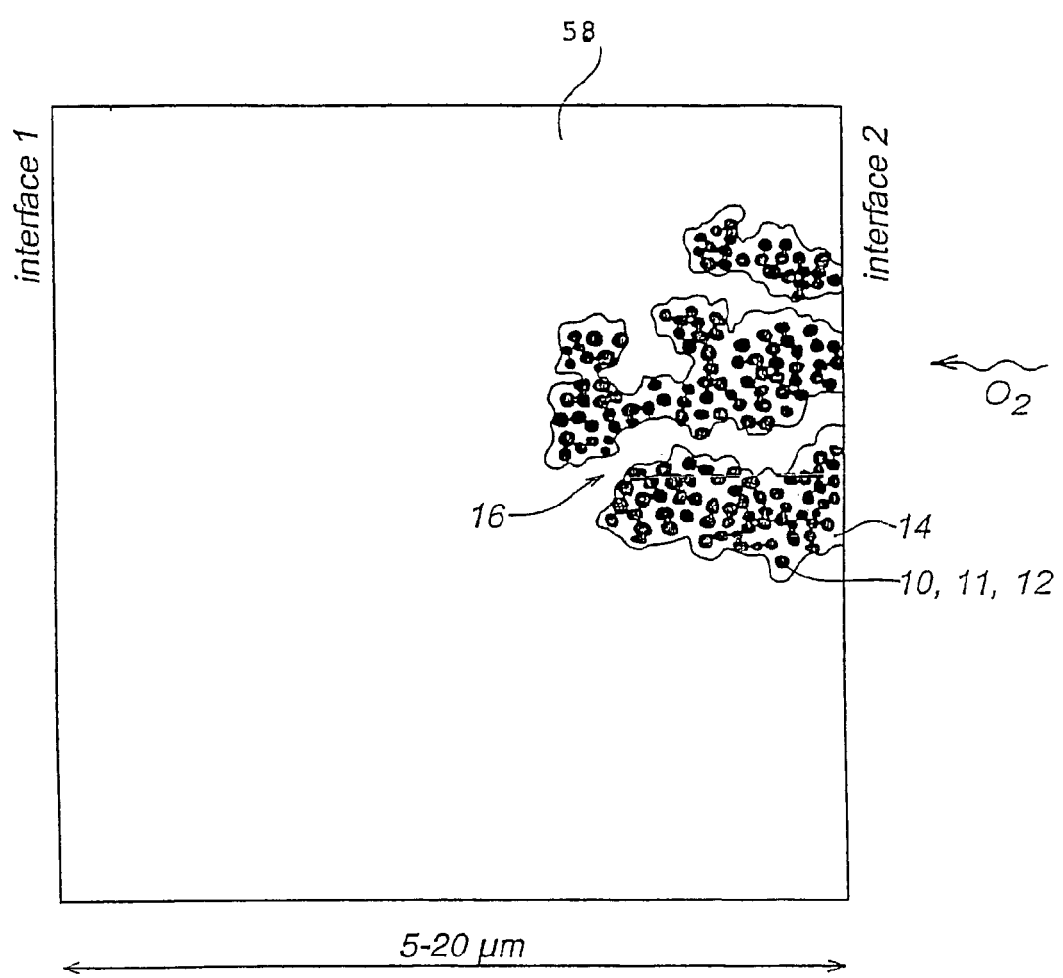
FIG. 1 schematically illustrates the cathode layer structure according to the invention on a microscopic level.

The result of the processes indicated above will be a structure as shown in FIG. 1. This structure comprises a three-dimensional network of C/Pt-particles 10 covered with a first layer 12 of hydroxide ion conducting polymer (not shown, see FIGS. 2 and 3), and a second layer 14 of proton conducting polymer thereon. Within the network there will be pores 16 in which oxygen containing gas can flow. The dimensions of the C/Pt particles are approximately 30 nm diameter for the C particles, and approximately 2 nm diameter for the Pt particles deposited thereon. Migration paths for the hydroxide ions as small as 0.5 µm, and preferably smaller, are achievable with these methods. The entire cathode layer 58 is 5-20, and typically 10 µm thick.

Suitable cation exchange (conducting) polymers are those exhibiting the following general required properties
chemical stability in the environment (oxygen gas, tolerating temperature at least up to 100° C.)
no particular need of mechanical strength (imparted by the membrane, not the active layer)
high conductivity
possibility of solving the polymer to spray it or impregnate the active layer to obtain the fine desired structure Suitable polymers having these properties are perfluorinated ionomers based on strong acid functions like perfluorosulfonic acid (NAFION™, FLEMION™, ACIPLEX™ are perfluorinated ionomers based on this principle); a range of conductivity attained by these commercial polymer membranes is 5-15 S/cm². These polymers are based on the —$SO_3H$ acid function.

Other suitable polymers are perfluorinated ionomers based on weak acid functions such as —COOH (this type of polymers are obtainable from e.g. Asahi chemicals). This kind of polymers has shown lower conductivity and lower water content than polymers based on —$SO_3H$ acid function.

Another type is radiation grafted polymers. These polymers show similar conductivity to the perfluorinated ionomer NAFION™ but have lower chemical stability.

Suitable anion exchange (conducting) polymers are those that have similar or like general properties as the cation exchange polymer, except that since the anion exchange polymer being in contact with the catalyst will be submitted to a more oxidizing environment (intermediate products of the ORR may be even more oxidizing than $O_2$), chemical stability is more important for the anion exchange polymer. On the other hand, conductivity is less important because the migration length is shorter in the anion exchange polymers than in the cation exchange polymers (the anion exchange polymer forms a thin film of polymer around catalyst)

Basic anion conducting polymers can be based on the fixed quaternary ammonium groups —$NR_3^+$ or —$NR^+$— (the sign — symbolizes a bond with an other atom in the chain, + is the charge of the group, R is any hydrocarbon compound, it can also be H alone). For example, polyethersulfone $PSU(NH_2)_2$, polyvinylpyridine or polybenzimidazole PBI (reference can be made to Kerres et al., Journal of new Materials for Electrochemical systems, 3 (2000), p 229 for details regarding preparation of such polymers, and the entire contents of this article is incorporated herein by reference).

Finally the cation exchange polymer and anion exchange polymer must show good "compatibility" between each other (small "contact resistance")

Figure 2:
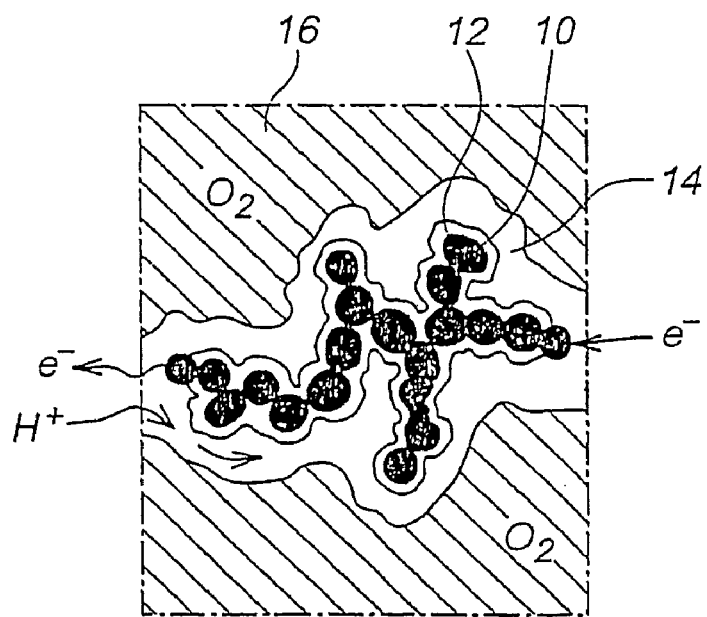
FIG. 2 is an enlarged view of the structure of FIG. 1.
Figure 3:
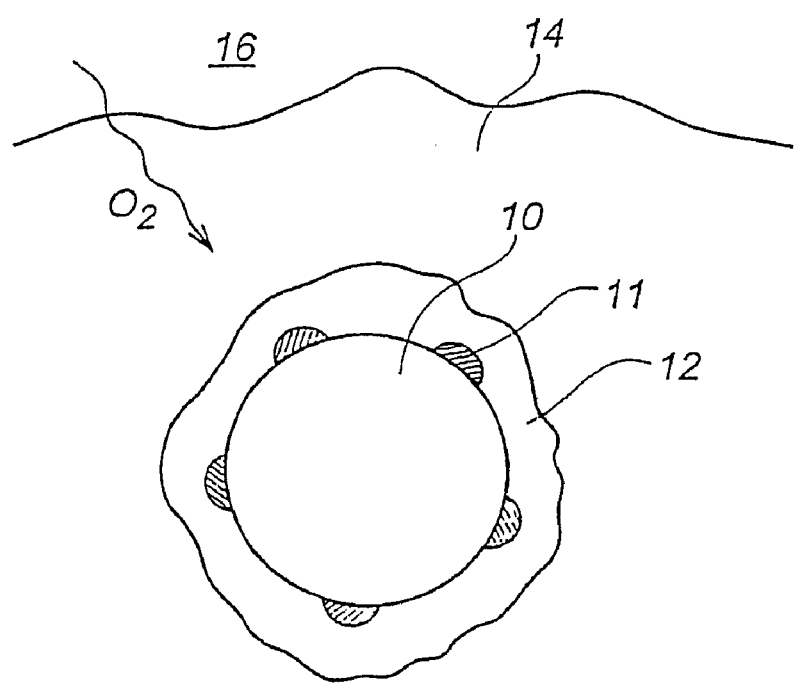
FIG. 3 is a detailed schematic view of the ideal arrangement between the four phases (gas/$H^+$ conducting polymer/$OH^-$ conducting polymer/catalyst+$e^-$-conducting support)

In FIGS. 2 and 3 the structure of the three-dimensional network is shown in still greater detail. Thus, the carbon particle 10 (see FIG. 3), the size of which is approx. 30 nm, having Pt particles 11 (approx. 2 nm) deposited on the surface is shown embedded in the OH⁻ conducting polymer layer 12. The H⁺ conducting polymer 14 encloses the regions of particles 10, 11 contained in the OH⁻ conducting layer 12.

Figure 4:
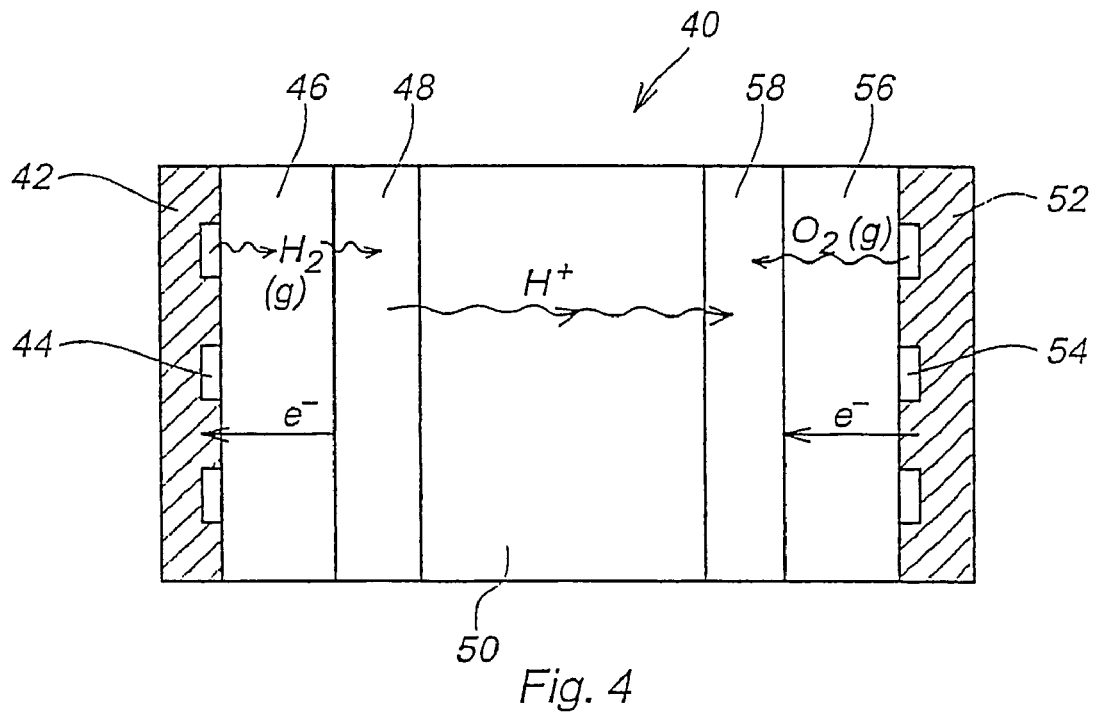
FIG. 4 is a schematic illustration of a fuel cell incorporating the inventive cathode layer structure.

An entire fuel cell incorporating the cathode layer structure according to the invention will now be described with reference to FIG. 4.

The reactions taking place inside the entire cell structure are as follows:

At the cathode/+pole the following reaction takes place:

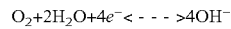

This reaction will thus take place in an alkaline medium, and the kinetics will be much faster than in acid liquid electrolyte fuel cells or SPFC with proton conducting polymer.

At the interface (hydroxide ion conducting polymer)/(proton conducting polymer) located in the cathode layer structure according to the invention the following reaction takes place:

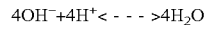

Thus, a fuel cell generally designated 40 comprises a current collector plate 42, in which there are gas channels 44 for the supply of H$_2$ (or other fuel). There is further a porous gas diffusion layer 46 through which gas passes. In contact with said gas diffusion layer 46 is the (active) anode layer 48. The anode layer comprises carbon particles coated with Pt particles, embedded in a proton conducting polymer, forming a three-dimensional network with gas pores for the transport of H$_2$ (g). In this layer the anode reaction

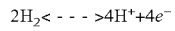
$2H_2 \leftarrow - - \rightarrow 4H^+ + 4e^-$ takes place. The protons formed in this reaction are conducted in the proton conducting polymer and migrate further through a proton conducting membrane 50, which separates the anode side from the cathode side in the cell.

On the cathode side there is also a cathode current collector 52, having gas channels 54 for O$_2$ or oxygen containing gas. A cathode diffusion layer 56 is provided in contact with the inventive cathode layer structure 58 located between the proton conducting membrane 50 and the cathode diffusion layer 56. In this layer 58 the cathode reaction

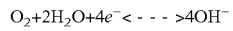
$O_2 + 2H_2O + 4e^- \leftarrow - - \rightarrow 4OH^-$ takes place.

The material transport through a cell is as follows.

O$_2$ diffuses in diffusion layer 56 and then in the active layer in gas phase. O$_2$ is then dissolved in the polymer present in the active layer and diffuses from the interface polymer-gas pores to the carbon particles carrying the catalyst particles. The e$^-$ consumed by the cathode reaction are conducted from the current collector 52 through the diffusion layer 56 and then through the carbon particles 10 that are in contact with each other.

The H$^+$ ions migrate through the H$^+$ conducting polymer (14 in FIG. 2), and OH$^-$ carries the current through the anion conducting polymer (12 in FIG. 2), and OH$^-$ and H$^+$ react to form water at the interface between polymers 12 and 14.

Thus, the H$^+$ consumed by the cathodic reaction are conducted from the anode side through the membrane and then through the cathode active layer, by virtue of the H$^+$ conducting polymer that is present in this layer.

A carbon particle must be reachable simultaneously by e$^-$ from the interface between cathode layer/gas diffusion layer (Interface 2) and in contact with anion conducting polymer, which in turn is in contact with H+ conducting polymer, the later conducting the protons from the interface between membrane/cathode layer (Interface 1) to the interface between the two polymers, in order to be able to contribute to the generation of electricity (see FIG. 1). Thus, there must be present paths for the H$^+$ and for the e$^-$, having such properties that the above requirement is met.

A merit of this invention is the possibility to use an alternative to Platinum as Catalyst. Platinum is the best catalyst for the oxygen reduction reaction, but it is also possible to use metals such as Fe, Co, Cr (activity around 100 times less).

Thus, using Pt in alkaline medium will improve the kinetics compared to a use of Pt in acid medium, while using "second class" catalysts as Fe, Co, Cr or organic metal complexes (CoTPP, FeTPP) in alkaline medium will give the same kinetics compared to Pt in acid medium (state of the art).

Figure 5:
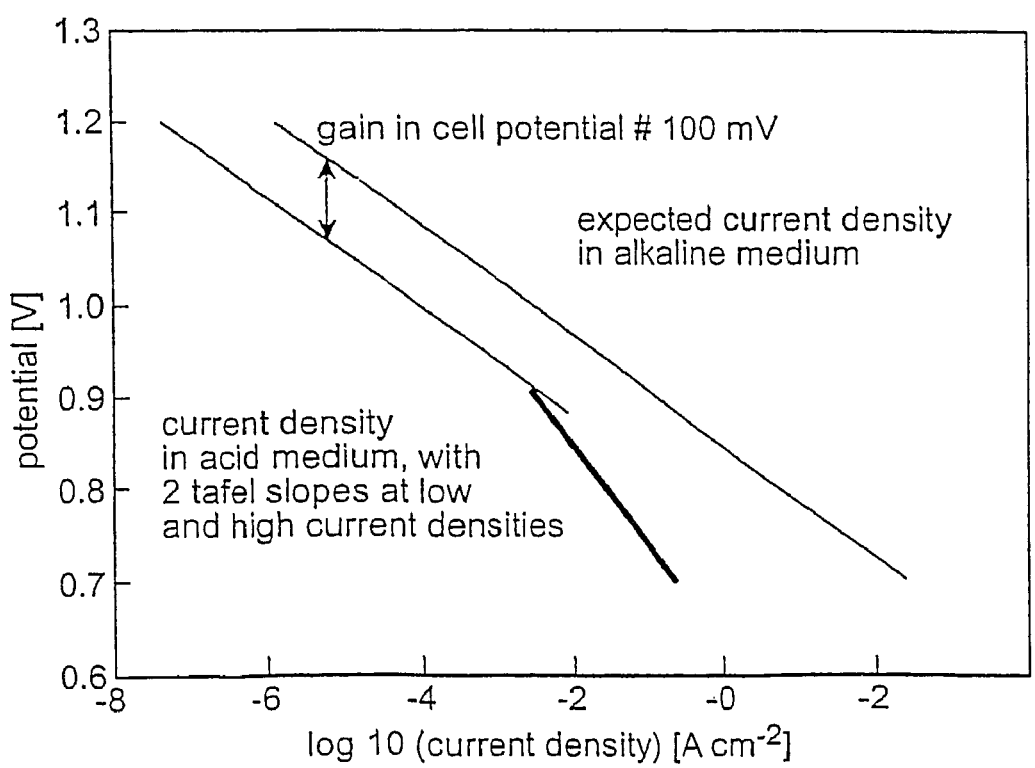
FIG. 5 is a tafel plot drawn from results presented in Perez et al, vide infra.

FIG. 5 shows two hypothetical Tafel plots for ORR in acid and alkaline media drawn by extrapolating the results obtained on a rotating disc electrode presented in "Oxygen electrocatalysis on thin porous coating rotating Pt electrodes", *Electrochimica Acta,* 44, p1329, Joelma Perez et al. to a porous electrode for SPFC with high catalyst area. Both the exchange current density (30 times higher in alkaline medium than in acid medium) and tafel slopes (14°$_0$ better in alkaline medium) will contribute to increase the voltage of a cathode working in alkaline medium by about 130 mV, in comparison with a cathode working in acid medium (see FIG. 5).

Now preparation of a basic and acid catalyst layer for SPFC will be described, by way of a comparison of preparation of state of the art catalyst layer for SPFC and a possible way of preparation of acid and basic layers.

EXAMPLE 1 (STATE OF THE ART)

Step I: Preparation of an ink consisting of Pt supported catalyst and solubilized proton conducting polymer which is in Na$^+$ or TBA$^+$ form. Proton conducting polymers of NAFION™ type perfluorinated ionomers in Na$^+$ form tolerate higher temperatures that enables the hot pressing step. The solubilized proton conducting polymer imparts ion conductivity to the catalyst layer but also acts as a binder and imparts robustness, and integrity to the layer.

Step II: Mixing the ink thoroughly for several hours (typically 20-40 wt % Pt on C, 5 wt % NAFION™ perfluorinated ionomers)

Step III: Different possibilities to apply ink on the membrane
a) the "decal" process (i.e. ink is cast onto TEFLON® fluoropolymer sheets and then transferred to membrane in Na$^+$ form by hot pressing)
b) the ink is directly cast onto the membrane in Na$^+$ form
c) the ink is sprayed onto the membrane in Na$^+$ form Step IV: Hot pressing of the membrane electrode assembly (MEA) to impart robustness and long term stability (typically 200° C., pressure 60 atm)

Step V: Ion-exchange of membrane and catalyst layer by boiling in sulfuric acid (typically 0.5-1 M for several hours) rinsing with water, repeated several times.

EXAMPLE 2 (CATHODE LAYER STRUCTURE ACCORDING TO THE INVENTION)

One fundamental aspect to be noted, is that it will not be possible to ion-exchange a catalyst layer made of a mixture of hydroxide conducting polymer and proton conducting polymer.

As results obtained in our laboratory have shown, temperatures as high as 200° C. are not necessary to impart long term stability or good performance, and ion exchanging the acid-and-base catalyst layer can simply be avoided without drawback.

Another possibility is to use types of polymers that would tolerate the hot pressing conditions under proton and hydroxide form directly. Then no ion exchanging is needed either.

Both possibilities are described now.

Step I: Preparation of ink consisting of supported catalyst and solubilized OH$^-$ (anion) conducting polymer in OH$^-$ form, using a first solvent (i.e. a solvent suitable for dissolving the OH$^-$ conducting polymer. Examples are an aqeous solution of lower alcohols, such as methanol, ethanol, propanol, iso-propanol, etc.).

Step II: Mixing the ink thoroughly for several hours.

Step III: Spray or cast the ink on a surface such as a sheet (e.g. TEFLON® fluoropolymer sheet) and evaporate the first solvent to result in a powder of supported catalyst covered by a thin film of the OH$^-$ conducting polymer. The film must be as thin as possible, typically less than 1 μm.

Step IV: Mixing of this powder with the solubilized proton conducting polymer in H⁺ (cation) form in a second solvent (the solvent for the proton conducting polymer should be a bad solvent of the OH⁻ conducting polymer otherwise the created film of the 1st polymer on the catalyst will be diluted in the 2nd polymer, and only part of the catalyst would then be in contact with the 1st polymer).

Step V: Different possibilities to apply the ink on the membrane. Best solution for scale up and automatization seems to be the spray method directly on the membrane in H⁺ form kept at typically 130° C. for NAFION™-type perfluorinated polymer, in order to evaporate the solvent of the proton conducting polymer and also to impart robustness to the catalyst layer. One modification of this step might be to use polymers that tolerate higher temperatures than NAFION™ perfluorinated polymer types and then the spray procedure could be followed by a hot pressing procedure described in state of the art with the difference that the polymers would be in respectively OH⁻ and H⁺ form.

In state of the art electrodes, the weight ratio of NAFION™ perfluorinated polymer mass to total catalyst layer mass is typically 20-40 wt %, thus the weight ratio of (proton+hydroxide conducting polymers) to total catalyst layer mass should be in the same order.

Next, the optimum ratio of OH⁻ conducting polymer to H⁺ conducting polymer in the active layer is a function of the value of the conductivity of the hydroxide conducting polymer compared to the value of conductivity of the proton conducting polymer and the value of the oxygen permeability of both polymers. Different cases are considered:

If the conductivity of the hydroxide conducting polymer is much lower than that of NAFION™ perfluorinated polymer, its weight ratio should be minimized to the amount necessary to cover most part of the catalyst particles.

If the conductivity of the hydroxide conducting polymer is comparable to that of NAFION™ perfluorinated polymer, but its oxygen permeability is much lower than that of NAFION™ perfluorinated polymer, then its weight ratio should also be minimized to the amount necessary to cover most part of the catalyst particles.

If both the conductivity and oxygen permeability of the hydroxide conducting polymer is comparable to that of NAFION™ perfluorinated polymer, various blends of the 2 polymers can be used to fabricate the catalyst layers without detrimental effect on the electrode performance. The optimum ratio will be a function of the exact properties of the 2 polymers (O₂ permeability and conductivity).

The invention claimed is:

1. A cathode layer structure for a solid polymer fuel cell, said cathode layer structure comprising a catalyst embedded within a polymer system,
    wherein said polymer system comprises an anion conducting polymer and a cation conducting polymer,
    an interface between the anion conducting polymer and the cation conducting polymer is located entirely within said cathode layer structure; and
    said catalyst is fully covered by said anion conducting polymer,
    wherein said cation conducting polymer fully encloses all regions of said anion conducting polymer.

2. The cathode layer structure as claimed in claim 1, wherein said catalyst is a metal provided on a carbon support.

3. The cathode layer structure as claimed in claim 2, wherein said metal is selected from the group consisting of Pt, Fe, Co, Cr, or mixtures thereof.

4. The cathode layer structure as claimed in claim 1, wherein said catalyst is an organic metal complex of a metal selected from the group consisting of Pt, Fe, Co, Cr, or mixtures thereof.

5. The cathode layer structure as claimed in claim 4, wherein said complexes include tetraphenylporphyrins.

6. The cathode layer structure as claimed in claim 1, wherein the catalyst is deposited on carbon particles as a carrier.

7. The cathode layer structure as claimed in claim 6, wherein the carbon particles with deposited catalyst form a porous three-dimensional network.

8. The cathode layer structure as claimed in claim 1, wherein said cation conducting polymer is selected from the group consisting of perfluorinated ionomers based on acid functions, and radiation grafted polymers.

9. The cathode layer structure as claimed in claim 1, wherein said cation conducting polymer is selected from the group consisting of perfluorinated ionomers based on acid functions.

10. The cathode layer structure as claimed in claim 1, wherein said anion conducting polymer is selected from the group consisting of perfluorinated ionomers.

11. The cathode layer structure as claimed in claim 1, wherein said anion conducting polymer exhibits chemical resistance in oxidizing environment.

12. The cathode layer structure as claimed in claim 8, wherein said group consisting of perfluorinated ionomers includes perfluorosulfonic acid.

13. A cathode layer structure for a solid polymer fuel cell, said cathode layer structure comprising a catalyst embedded with a polymer system,
    wherein said polymer system comprises an anion conducting polymer and a cation conducting polymer, a plurality of distinct interfaces between the anion conducting polymer and the cation conducting polymer are located entirely within said cathode layer structure; and
    said catalyst is embedded in said anion conducting polymer, wherein the catalyst is fully surrounded by the anion conducting polymer, which in turn is surrounded by the cation conducting polymer.

* * * * *